(12) United States Patent
Lipsky

(10) Patent No.: US 11,562,035 B2
(45) Date of Patent: Jan. 24, 2023

(54) ENHANCEMENT OF ELECTRONIC COMMUNICATIONS AND DOCUMENTS WITH LINKS TO CONTEXTUALLY RELEVANT INFORMATION

(71) Applicant: Bantr, Inc., Seattle, WA (US)

(72) Inventor: Scott Lipsky, Seattle, WA (US)

(73) Assignee: Driftwood Capital, LLC, Seattle, WA (US)

( * ) Notice: Subject to any disclaimer, the term of this patent is extended or adjusted under 35 U.S.C. 154(b) by 8 days.

(21) Appl. No.: 15/924,130

(22) Filed: Mar. 16, 2018

(65) Prior Publication Data
US 2018/0268059 A1    Sep. 20, 2018

Related U.S. Application Data

(60) Provisional application No. 62/472,084, filed on Mar. 16, 2017.

(51) Int. Cl.
| | |
|---|---|
| *G06F 16/951* | (2019.01) |
| *H04L 67/10* | (2022.01) |
| *H04L 67/02* | (2022.01) |
| *G06F 16/248* | (2019.01) |
| *H04L 67/52* | (2022.01) |
| *H04L 67/50* | (2022.01) |

(52) U.S. Cl.
CPC .......... *G06F 16/951* (2019.01); *G06F 16/248* (2019.01); *H04L 67/02* (2013.01); *H04L 67/10* (2013.01); *H04L 67/52* (2022.05); *H04L 67/535* (2022.05)

(58) Field of Classification Search
CPC ..... G06F 16/951; G06F 16/248; H04L 67/02; H04L 67/10; H04L 67/18
USPC .......................................................... 707/722
See application file for complete search history.

(56) References Cited

U.S. PATENT DOCUMENTS

| | | | |
|---|---|---|---|
| 8,862,598 B1 * | 10/2014 | Marra ................. | G06F 16/9535 707/754 |
| 2012/0239761 A1 * | 9/2012 | Linner .................. | G06F 40/279 709/206 |
| 2013/0218885 A1 * | 8/2013 | Satyanarayanan ... | G06Q 30/016 707/728 |
| 2013/0339334 A1 * | 12/2013 | Brown ................ | G06F 16/9535 707/706 |
| 2014/0379744 A1 * | 12/2014 | Kuo .................. | G06F 16/90324 707/767 |

(Continued)

*Primary Examiner* — Hosain T Alam
*Assistant Examiner* — Nicholas E Allen
(74) *Attorney, Agent, or Firm* — Perkins Coie LLP

(57) ABSTRACT

In an exemplary embodiment, an application server is disclosed that receives user information including textual content from a user device. The application server improves electronic communications and user collaboration by searching public or private databases for information relevant to the received textual information and providing a means for including selected related information such as links with an electronic communication or document when it is sent to a recipient. The application server interfaces with text messaging, instant messaging, email, and document applications to improve the information accuracy and efficiency of generating a document or message as well as improving the ease of communication and collaboration.

28 Claims, 5 Drawing Sheets

(56) References Cited

U.S. PATENT DOCUMENTS

| | | | |
|---|---|---|---|
| 2016/0034600 A1* | 2/2016 | Joshi | G06F 16/3329 |
| | | | 707/769 |
| 2016/0378776 A1* | 12/2016 | Green | G06F 16/9537 |
| | | | 707/737 |
| 2017/0132019 A1* | 5/2017 | Karashchuk | H04W 4/12 |
| 2017/0353414 A1* | 12/2017 | Ertmann | H04L 51/32 |
| 2018/0005263 A1* | 1/2018 | McNulty | G06Q 40/12 |

\* cited by examiner

ENHANCEMENT OF ELECTRONIC COMMUNICATIONS AND DOCUMENTS WITH LINKS TO CONTEXTUALLY RELEVANT INFORMATION

CROSS-REFERENCE TO RELATED APPLICATION(S)

This application claims priority to and benefit from U.S. Provisional Patent Application No. 62/472,084, entitled "System and Method for Automatic Discovery, and Opt-in Inclusion, of Links to Relevant Search Results in a Message Composition Session," filed on Mar. 16, 2017, which is hereby incorporated by reference in its entirety.

BACKGROUND

Messaging between users involves a user composing a communication such as a message in an application and sending it from the application to a reader. Over time, as more and more information has become available online, users have more frequently had the need, while composing a message, to retrieve information from websites such as links to businesses, directions to a street address, flight information, weather information, product information, and/or current news. For example, a user has had to copy URLs from one application and then to return to the composition process to paste the URLs into their message before sending it. Recipients of messages may have a similar need to retrieve information from one or more websites or other available data sources about the contents of a received message. For example, if a message composer does not include URLs or links to information about which the message was written, the recipient(s) of the message may need to look-up information in, for example, a web browser about the topic of the message. A user may do so by copying and pasting message contents into a search engine in order to find helpful information from the Internet. The disconnection between composition of a message and the need to search for, and retrieve, information that is relevant to what is being composed, results in a loss of time as users go elsewhere for such information, requires additional steps which may introduce errors in the message, and provide suboptimal information exchange between composers and recipients of messaging. More efficient means are needed for communicating a greater amount of information and with improved accuracy.

SUMMARY

A system and method to add supplemental information to an electronic message or document that is composed by a user and intended for subsequent review by a reader is disclosed herein. In an exemplary embodiment, an application server is disclosed that receives user-entered information (including textual content) and other contextual information from a user device. The application server improves electronic publication, electronic communications and user collaboration by searching public or private databases and/or online services for information relevant to the received information and providing a means for including selected supplemental information (such as links to additional information) with the electronic content, message, or document. A subsequent reader of the electronic content, message, or document is able to access the provided supplemental information. The application server interfaces with text messaging, instant messaging, email, and document creation and publishing applications to improve the information accuracy and efficiency of generating content, a document or message as well as improving the ease of communication and collaboration.

In an exemplary embodiment, a method of electronic messaging is disclosed. The method includes receiving, at an application server from a client device, user information including textual content, location information related to the client device, client identification information, and client service information. The method includes applying, at the application server, the received user information to one or more databases or online services to determine one or more search results. The method includes transmitting, to the client device, the one or more search results, wherein each search result includes at least one link such as a web link pointing to information relevant to the received user information. The client device displays an indication for each word or phrase from the textual content with an associated search result. The client device displays an opt-in user interface for each search result including a selectable indication associated with the search result. For each of the one or more selected indications, the one or more search results may be combined with the textual content and sent to a reader.

The method may further include any of the following features in any combination. The method may further include storing at the application server in a database the one or more search results and the user information. Receiving the textual information may include receiving the textual information from a text messaging application, an instant messaging application, or an email application, or other application. The one or more databases may include one or more public databases available to users of the application server. The one or more databases may include one or more private databases available to only a selected group of users of the application server, wherein the selected group of users are associated with a predetermined business or corporation. The one or more databases may be stored locally at the application server to enable rapid determination of the one or more search results. The client device may remove words contained on a common word list from the textual content before sending the contextual content to the application server, wherein the common word list includes words such as "a", "the", and "to". The application server may intermittently or periodically receive updates to the user information as the textual content is being generated at the client device. The application server may determine from the client identification information that the client device is registered with the application server, and/or may determine form the client service information that the client device is authenticated to access the application server. The location information may include one or more of a global positioning system (GPS) location, a location based on triangulation information from a plurality of cellular telephone base stations, or location information from an Internet service provider (ISP). The application server includes one or more of a computer system, a network server, or a virtual machine, and the client device includes one or more of a smartphone, a cell phone, a laptop computer, a tablet computer, or a desktop computer.

DETAILED DESCRIPTION

Figure 1:
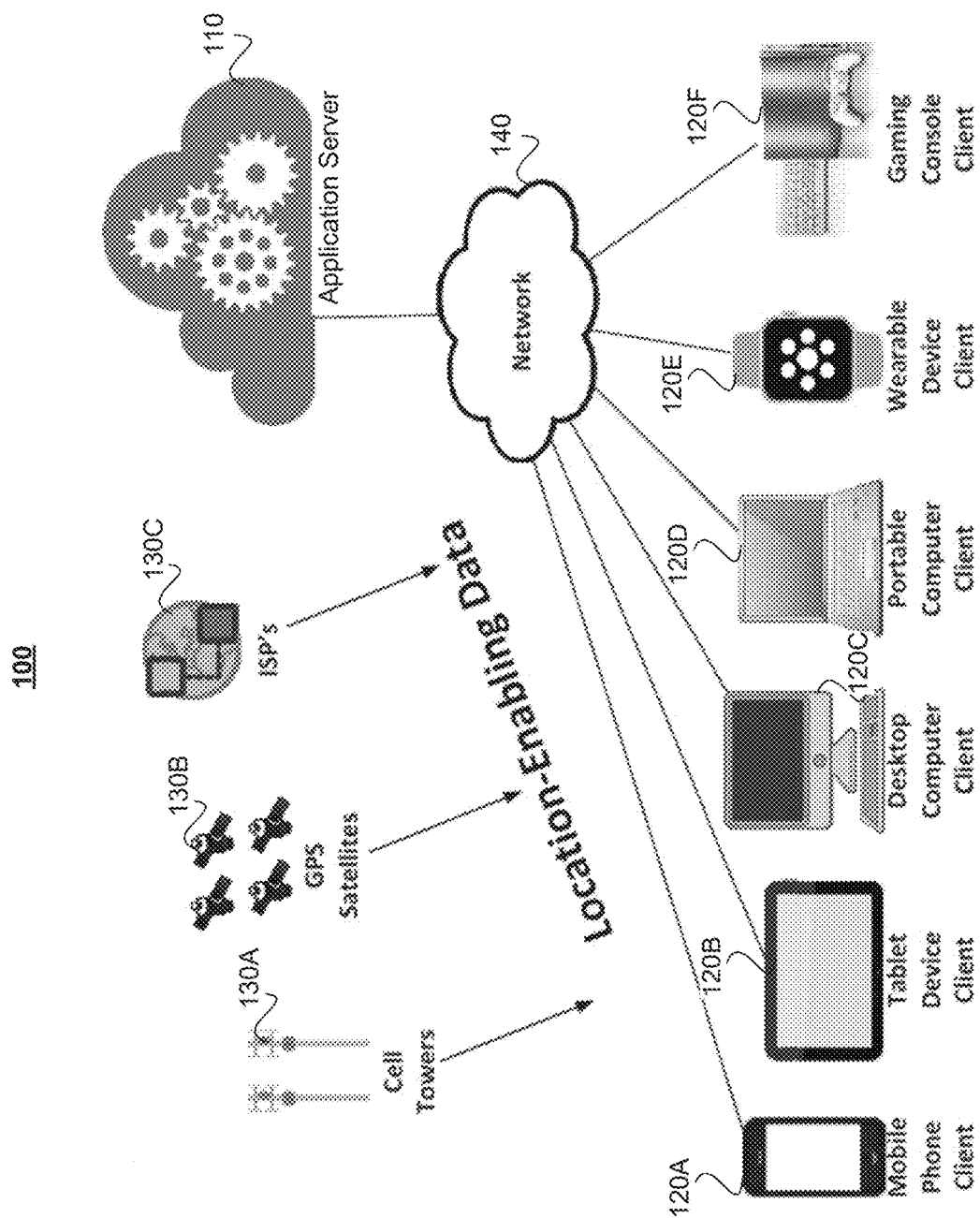
FIG. 1 depicts an example of an environment in which the disclosed technology operates, in accordance with some example embodiments.

In some example embodiments, an electronic communication composed on a client device may be improved via an application server that scours one or more public or private databases for information related to the electronic communication and includes the related information in the electronic communication. For example, the application server may access one or more locally-stored databases such as business directories, directories of individuals and/or factual information databases such as encyclopedias or dictionaries. In some example embodiments, the application server may search databases outside what is stored locally. As the electronic communication is being generated, or after it is generated, the client device may send a request message to the application server. The request message may include all or part of the content of the electronic communication and may include additional information such as the location of the client device, user identification information, and/or service information such as information about an account at the application server associated with the client device or user. The application server receives the request message and searches the one or more databases for data related to the content of the message. For example, the application server may search one or more databases and generate Uniform Resource Locator (URL) links corresponding to the data related to the content of the message. The application server sends the links to the client device and the client device receives the links and displays or otherwise presents the links at the client device. The user may select, or opt-in, one or more of the links, or none of the links. The selected links are included in the electronic communication when the electronic communication is sent to a receiving device, or a reader.

The above-noted electronic communication may be a communication sent to a user, or a group of users, via a text message, an instant message, an email, or other written communication. The electronic communication may be sent to a server such as a blog server or other hosting server rather than being directed to a user or group of users. The electronic communication may be directed to a server that does not publish or display the electronic message but rather uses the message for another purpose such as responding to a query. The electronic communication may be composed using any generic or specialized textual communication software or application. In some example embodiments, the electronic communication may be text from a speech-to-text application. For example, a user may speak a message and a speech-to-text application transforms the speech into text that is input into a messaging application which in turn interfaces to the application server.

The one or more databases may be public databases or private databases. Public databases may be searched by any client device or user. For example, the application server responding to a text message generated by a public user may use the public databases. Private databases may include private information whose searching is limited to a predetermined list of users or users with a predetermined feature such as an email address domain name. For example, a private database may include product information or corporate information such as sales information for the corporation. The application server may limit the search of the corporation's private database to employees with email addresses associated with the corporation or a specified list of approved users.

The client device may include any type of computing device such as a mobile phone, a smartphone, a tablet computer, a desktop computer, a laptop computer or other portable computer, a wearable computing device, a gaming device, or any other computing device.

The application server may include any type of computing device including computer hardware and software to perform the application server functions and processes described herein. The application server may include networking interfaces to interface to wired interfaces such as a wired or optical Ethernet interface and/or wireless interfaces such as the Wi-Fi family of interfaces, a cellular wireless interface, or other wireless interface. In some embodiments the application server may be hosted on a virtual machine instantiated in a computer supporting multiple virtual machines. The application server may include storage for database information. A database that is stored locally for use by the application server may be referred to as an "ingested" database because the database is received via download over the Internet or received via a physical device such as a memory stick, portable disk drive, or CD/DVD and stored for quick and immediate access by the application server. As used herein, "database" refers to any data structure that stores data in a structured and accessible fashion such as tables, linked lists, arrays, as well traditional databases.

The application server receives location information from the client device as well as all or portions of the message as it is being composed at the client device. In response, the application server provides relevant search results (including links and other associated information) that are related to the user's entered message and location. In order to insert into the message one or more links corresponding to the returned search results, the client device displays an opt-in interface to the user. The interface allows the user to quickly select the desired search results including the selected links to be included with the composed message, thereby reducing errors and improving efficiency and the breadth of the included information. The breadth may be improved via use of special databases ingested by the application server that are not available elsewhere. Use of the application server reduces errors compared to manually switching between composition and researching, and saves time and steps in the messaging conversation (including 1-to1 and 1-to-many style conversations). Additionally, the easier sharing of information using the application server allows for faster and more efficient conversations via messaging, and can reduce the number of messages needed to collaborate on a topic, thereby saving time for parties within a conversation or collaboration. The combination of composed content, location data, and including links when the user opts-in to a returned search result, provides improved messaging efficiency, accuracy, and completeness of information.

The technology described herein may be used within a messaging application and can be used within other applications that facilitate user-written content creation. For example, the technology is applicable to composition of email, composition of content within enterprise or nonenterprise collaboration activities, composition of articles or publications, composition of blog entries, composition of website content as well as many other uses where a user is composing content that is to be read and consumed by others in many possible capacities.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 depicts an example of an environment in which the disclosed technology operates, in accordance with some example embodiments. An application server 110 searches one of more databases for data related to a message from the client device. To perform the searches, the application server may rely on user-entered or selected content (also referred to herein as textual content) as well as user information such as location information, identification information, and/or service information such as information about an account associated with the client device or user. Representative client devices 120A-120F are connected to application server 110 via network 140. Various geopositioning systems 130A-130C may be used to derive or estimate the location of the client devices 120A-120F. Application server 110 searches the one or more databases for information relevant to the message and provides links to the relevant information to the user composing the message on the device. The user may opt to include the provided links with the textual content of the message to a recipient by the use of an opt-in interface. The operation of each element in the environment in FIG. 1 will now be addressed in greater detail.

The application server 110 receives a request message from a client device. The request message may include content generated or selected by a user, location information, identification information, and/or service information. The content may include textual information such as text generated from a keyboard, touchscreen, speech-to-text application, or other input device. The content may include handwritten text that may be reduced to textual characters or may remain in its graphical form. The application server searches one or more local databases such as one or more public databases stored in the application server and/or one or more private databases stored at the application server for information relevant to the message. The application server may utilize all or portions of the received content, device location information, and subscription information in the formulation and execution of the search queries. The application server may also search non-local databases in addition to, or in place of, the local databases. As illustrative examples, public databases may include business directories, directories of people, databases related to search engines, and/or other catalogs of factual information such as encyclopedias and other information. Other public databases may be included in addition to, or in place of, the foregoing databases. Illustrative examples of private databases include product information such as specification information or price information for a corporation's products, sales information, supplier information, CRM information, and/or employee information such as employee names and personal information. Other private databases may be included in addition to, or in place of, the foregoing private databases.

Representative client devices 120A-120F are connected to application server 110 via network 140. Client devices include any type of computing device such as a mobile phone, a smartphone, a tablet computer, a desktop computer, a laptop computer or other portable computer, a wearable computing device, a gaming device, and any other device for facilitating human or automated interaction with the application server.

Representative geopositioning systems 130A-130C are systems that provide information from which the location of the client devices 120A-120F can be determined. For example, location information may be determined from a Global Positioning System (GPS) receiver to determine the latitude and longitude of the client device. GPS receivers are typically included in client devices such as a cell phone, smartphone, or other GPS-enabled device. Location information may also be derived from other satellite networks, cellular/mobile service towers/systems, WiFi hotspots mapped to physical locations, and Internet Protocol (IP) addresses assigned and managed by Internet Service Providers (ISP). The location of the client device may be determined by, for example, triangulation from cell tower signals received by the client device or reverse look-up of IP address assigned by the ISP to the client device.

Network 140 connects client devices 120A-120F to application server 110. Network 140 may include a public network such as a wired or wireless network, the Internet, and/or a private network such as a private network controlled by a business or corporation. Although represented as a network cloud, the network 140 may comprise one or more interconnected public and/or privately operated networks. A message transferred from a user device to the application server may therefore cross multiple networks including one or more of the foregoing networks. For example, the message may be sent from a smartphone connected via WiFi to a corporate network at a user's office. The message may traverse from the user device, through the WiFi network, to a wired corporate network, to the Internet, then on to the application server.

Figure 2:
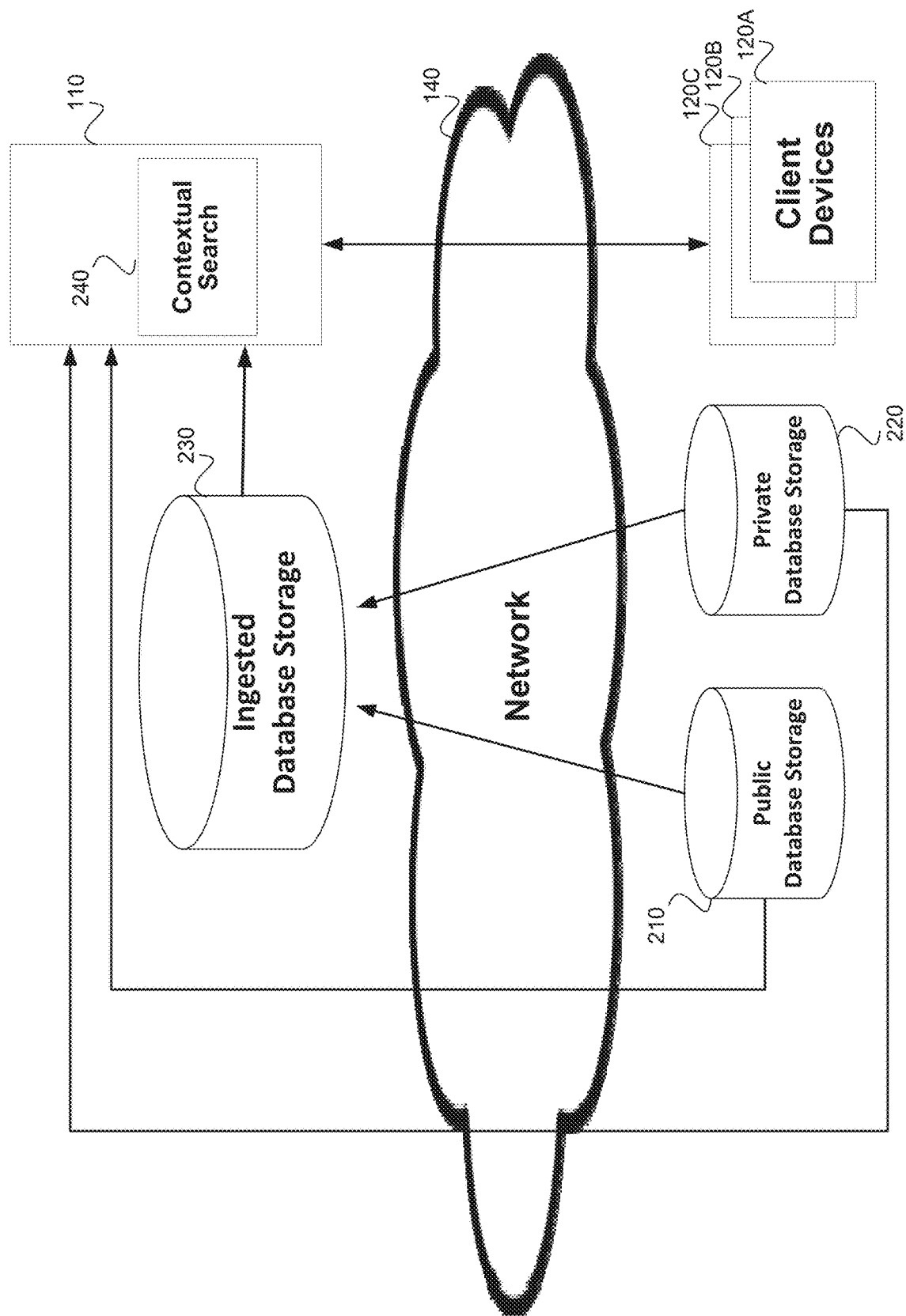
FIG. 2 depicts an example of a data source environment, in accordance with some example embodiments.

FIG. 2 depicts representative data flow to and from the application server 110 in accordance with some example embodiments. Application server 110 accesses locally stored databases (containing data referred to herein as "ingested" data) at ingested data storage 230. Application server 110 may also interface with public data storage 210 and/or private data storage 220 via network 140. A contextual search module 240 on the application server may search the local data storage, the remote data storage, or both when generating responses to requests from client devices. Application server 110 interfaces with client devices such as client devices 120A-120F. Although referred to herein as an "application server," the application server may comprise one or more physical or virtual servers cooperatively engaged to provide the supplemental content service described herein.

Public data storage 210 stores data such as public web site data, or licensed flat file or otherwise-formatted data that may be delivered digitally via the internet or via physical media and stored at public data storage 210. Private data storage 220 may be delivered digitally via the internet or via physical media and stored at private data storage 220. Public data storage 210 and private data storage 220 may each store multiple databases. Public data storage 210 and private data storage 220 may be at a location different from the location of the application server 110 and connected via network 140.

In some example embodiments, public data and/or private data may be "ingested" and stored locally at (or remote from) the application server 110 and ingested data storage 230. Ingested data storage 230 may be occasionally, intermittently, or periodically updated to add or update the ingested data stored there.

In some example embodiments, private data may be data provided to the application server from a user/customer of the application server 110, and may include a company's product data, customer data, or other proprietary data that the company makes available at the application server to provide their employees or customers with access to that data (but not other user groups outside an approved group). The private data may be stored at private data storage 220 or ingested and stored at ingested data storage 230. As an illustrative example, a user of the application server may be a salesperson for a manufacturer. While the user is communicating with a co-worker about a customer account, the user may write "I just had a call with XYZ (a customer)." The application server may search and find results about customer "XYZ", and the application server may underline "XYZ" while the user is typing, letting the composer know that a link to XYZ's account can be included in the communication without manually researching and finding that link to include in the communication to the co-worker. In this example, the private data may only be available to that user and other users or client devices authorized by the company to use it.

In some example embodiments, public data may be publicly available such as data that is not proprietary or limited in its dissemination. A user who has access to private data for contextual content search may also have access to public data. But, a user who has access to public data for contextual search may not have access to private data, unless authorized to use the private data by the owner/controller of the private data. Public data may include databases provided by database vendors and may include public information and/or publicly available search engine data. The public data may be stored at public data storage 210 or ingested and stored at ingested data storage 230.

Figure 3:
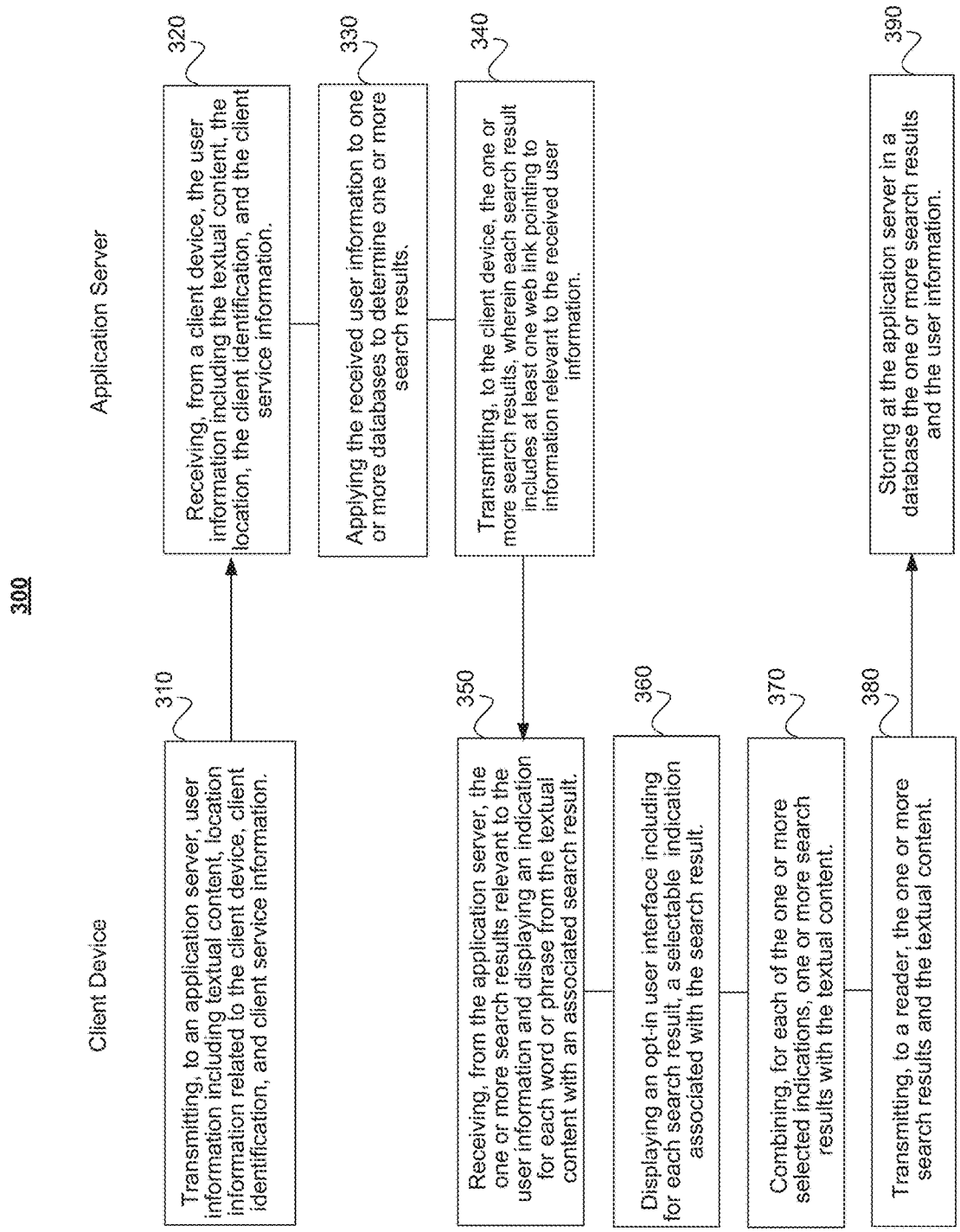
FIG. 3 depicts an example of a process, in accordance with some example embodiments.

FIG. 3 depicts an example of a process 300, in accordance with some example embodiments. At 310, a client device transmits user information and textual content to the application server. At 320, the application server receives the user information and textual content. At 330, the application server applies the user information and textual content to one or more databases to determine relevant search results. At 340, the application server transmits to the client device the search results which may include web links. At 350, the client device receives the one or more search results related to the user information and the textual content. At 360, the user device displays an opt-in user interface such as selectable boxes to indicate inclusion of one or more of the links with the textual content to be sent to a receiving device. At 370, the user device combines each of the selected search results with the textual content. At 380, the selected search results and textual content are transmitted to a reader such as another client device. At 390, the user information and textual content, the search results, the selected search results, the location information, and/or the service information may be stored in a database.

At 310, a client device transmits user information and textual content including user generated text, location information, client identification, and/or client service information to the application server. For example, as a user composes the textual content on the client device using a messaging application, the client device sends through network 140 the user information and textual content to the application server 110. The textual content may be sent intermittently or periodically while the user is composing the textual content, or the complete textual content may be sent when the user has finished entering the textual content. When sending the textual content to the application server, the client device may include all of the textual content entered by the user, or may filter the textual content to send certain words or word phrases that are entered by the user and remove other words. For example, the client device may maintain a list of non-essential words (e.g., "the," "a," "to") that are of little or no benefit to the application server when analyzing the received textual content. To reduce the number of transmissions, the client device may use the maintained list of non-essential words to determine whether or not a communication to the application server is needed and what words will be sent. The client device may transmit a portion of, or all, the textual content at one or more periodic or intermittent time intervals. In addition, the client device may track what portion of the textual content has previously been transmitted to the application server in order to avoid repeatedly sending the same textual content to the application server. For example, the client device may only send the first instance of the word "coffee" in a message, and may not send any subsequent uses of the same word in the same message to the application server.

In addition to the textual content, the client device may send to the application server location information related to the client device such as geo-location which may be determined by the client device (or known by an underlying operating system of the client device). The client device may also send identification information such as a client device ID as assigned by the application server and stored by the client device. In this way, the application server can track client device usage over time at the application server for each client device. The textual content, location, and identity of the client device or user may be used to tailor search results. By sending the client device ID and location each time textual content is transmitted to the application server, the application server can process each communication independently on a stateless basis. That is, the application server does not need to have knowledge of previously-received textual content from a client device in order to process a current request from the client device. By operating on a stateless basis, the complexity of the application server may be reduced and processing responsiveness may be improved. The application server can also operate in a "state-aware" state whereby it does keep track of the state of each of the client device devices. In this case, the client device may send the client device ID and location in its first transmission to the application server for each session.

The client device may send client device status information to enable the application server to determine the level of service, the format of returned data, and to enable the application server to collect performance information related to the state of the client device and the quality and speed of the client device's connection to the application server via the network that is being used to connect the client device with the application server.

At 320, the application server receives the user information and textual content including the user generated content, location information, identification information, and/or service information in the request message from the client device. After receipt of the client device request message, the application server processes the textual content and location information by applying the user textual content to the application servers data sets in order to identify search results that match the user's textual content, or identify results that may in other ways be related to the textual content of the user's message. Results, and their associated links, provide the user with supplemental information associated with the word or word phrases that are helpful or beneficial to the recipient (also referred to herein as a reader) of the message. The term "link," as used herein, is used to refer to a URL, Internet address, proprietary address, or other identifier which allows a recipient to access additional information related to the message. For example, the results may provide a link to a webpage about a business, an address of an individual or business, hours of operation about a business, etc. The application server may access local datasets, or may access third-party datasets in order to generate results that are associated with the received words or word phrases in the message textual content. When generating query responses, the application server may utilize the location information provided by the client device in order to limit search results to a geography related to the location of the client device at the time of the client device request. For example, if the received textual content includes a reference to a meeting at "XYZ Bookstore" and there are 500 "XYZ Bookstore" locations throughout the United States, the location information can be used to narrow or filter the search results returned to the client device to only the closest current location to the client device, or to a limited number of locations within the client device's current location or region.

When generating responsive search results, the application server may also use the history of requests from the client device to the application server to tailor the search results. By tracking aspects of usage of a client device's sessions with the application server, the application server may improve results to that client device's user over time by narrowing, filtering, or enlarging the results on subsequent sessions, or by remembering prior locations and results from previous sessions and using that information to include search results that might have been provided to the client device previously and may be useful to the user again.

At 330, the application server applies the user information to one or more databases to determine relevant search results. After processing the request message, the application server generates search results to be sent to the client device. The application server parses the textual content and performs one or multiple search queries to the application server against words or word phrases in the textual content. For a searched word or word phrase, the application server may find and return no results, or it may find and return multiple search results related to the search query. The application server may include with the search results one or multiple links to information that is related to the textual content. The search results may include other information that may be presented to the user such as a different or normalized representation of the search results, the address if the result topic has an associated address, categorical information regarding the search result, or other useful or identifying information as well as any identifying or other information that is related to the textual content.

Process steps 310, 320, and 330 may be repeated until the textual content has been completed at the client device. In some example embodiments, the application server may return to the client device control information to inform the client device of parameters for communicating with the application server or with instructions to update the capabilities of the client device. For example, the application server may specify timing parameters that the client device should use to communicate with the application server in subsequent messaging sessions. The application server may specify the amount of time that the client device should use as an interval for sending textual content to the application server while the user is composing the message, and/or the length of time that the client device should wait before sending textual content when the user pauses during message composition. As another example, the application server may provide a new network address for the client device to use to communicate with the application server after the end of the current session, and/or the application server may instruct the client device about availability of the application servers services, and/or about the existence of a new filtration list that the client device should retrieve from a particular network address, etc.

At 340, the application server transmits to the client device the search results which may include web links such as URLs. The web links may include publicly accessible URLs. The web links may include URLs that are only accessible in a private network or by approved users or chant devices. For example, links related to a business may have their accessibility limited to certain users such as employees, customers, or users on a list of approved readers. The supplemental information described above includes the links.

At 350, the client device receives the one or more search results related to the user information. Upon receipt of the search results from the application server, the client device may generate and may display an indication at the client device of the search results relevant to the textual content entered or selected at the client device. In some example embodiments, a visual indication presented at the client device display may include a change in font, underline, highlighting, or other text emphasis to show which words or phrases in the entered textual content have one or more corresponding search results.

At 360, the user device displays an opt-in user interface with selectable boxes to indicate inclusion of one or more of the links with the textual content to be sent to a receiving device. The client device generates an opt-in interface and displays the user interface. The opt-in user interface may include for each search result that is returned to the client device an indication of the search result and a check box or other selection mechanism to allow the user to select which search result(s) link to attach to the message. To attach one or more of the search result links to the message, the user may access an opt-in interface by selecting, for example, an opt-in button or other control. Using the interface, the client device allows the user to opt-in or include links corresponding to the selected results. The search results that the user does not select are not included in the message sent to the message recipient.

At 370, for each result that is opted-in, the client device includes the associated link for the search result within the textual content. The link may be formatted according to the type of entered data that the user is composing (e.g., text messages, emails, collaboration between users, written publications/blogs, etc.). For example, the link may be appended at the end of the message, or the link may be an embedded as a hyperlink in the content itself if the content format allows hyperlinking (e.g. if the content is in HTML or other link-embeddable format). The application being used by the user to enter the message textual content then transmits the textual content and links to the intended recipient. The user selects a send button or other control to direct the message to be sent. Alternatively, after selecting one or more search results in the opt-in interface, the user can return to the message and continue to edit the message. If the user adds additional textual content to the message, and if additional search results are received from the application server responsive to the added textual content, the user can revisit the opt-in interface and select additional search results for inclusion in the message. If, while continuing to edit the message, the user edits one of the words that displays an indication that search results relevant to the textual content have been received, the client device may remove the linked search results from the word since the linked information may no longer be relevant to the edited word.

At 380, the opted-in search results and user textual content are transmitted to a reader such as another user device. For example, the client device sends the user generated textual content with the links generated by the application server via a messaging, email application, or other application to the recipient. In some embodiments, the textual content and links may be sent via a cloud service or other service. For example, a web-based service may send the textual content and links. In another example, a cloud-based service may send the textual content and links. The web-based service and/or cloud-based service may include plugin code or other executable code to support the service.

At 390, the user information, textual content, complete search results, selected search results, location information, and/or service information may be stored in a database. The client device may transmit to the application server the list of results that the user has selected to include in the message to enable the application server to capture and store the usage of the client device and application server for purposes of quality control, tracking, analytical reporting, etc.

Figure 4:
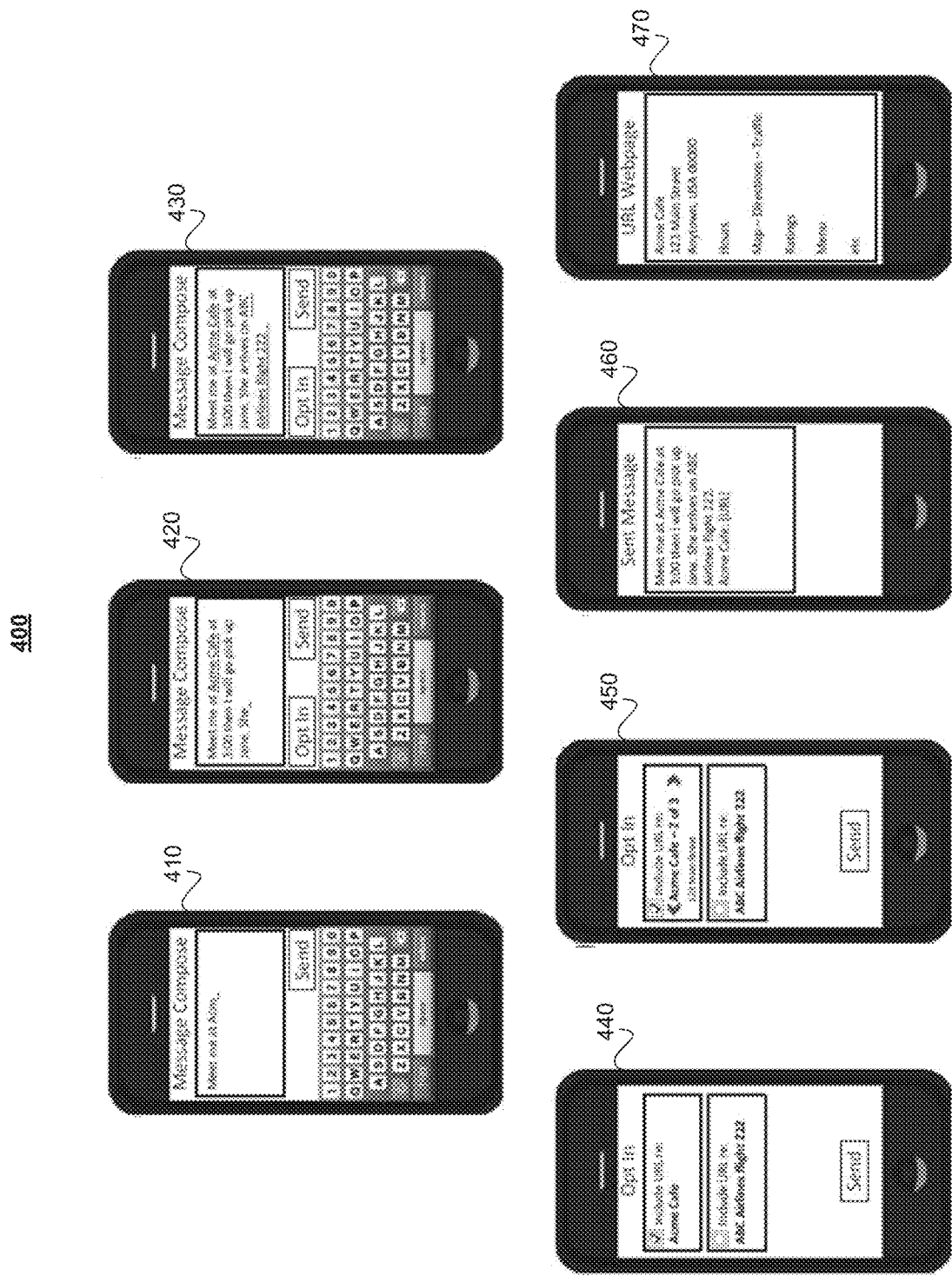
FIG. 4 depicts examples of user interface screens on a client device for a public messaging system, in accordance with some example embodiments.

FIG. 4 depicts examples of user interface screens on a client device for a public messaging system, in accordance with some example embodiments. At 410, textual content is generated. At 420, while the textual content is being generated, the client device sends textual content and user information to the application server which performs one or more searches. At 430, one or more search terms or words related to the textual content are high-lighted and the opt-in user interface is started. At 440, one or more search words or phrases are selected. At 450, when multiple search results are received for a search word or phrase, each of the multiple search results may be selected or not selected. At 460, the client device includes the selected opted-in links in the message sent to a reader. At 470, by selecting one of the links the reader is taken to the corresponding web page.

At 410, a user generates or selects textual content as part of a message or document. For example, the user may compose a text message to a recipient in a messaging application. The client device may be a stand-alone messaging application, or may be a plug-in or other program that interfaces with a messaging application. In some example embodiments, the textual information may be text from a speech-to-text application. For example, a user may speak a message and a speech-to-text application transforms the speech into text that is input into a messaging application which in turn interfaces to the application server.

At 420, while the textual content is being generated, the client device may send textual content including words or phrases to the application server which performs one or more searches. While the user is composing the text message, the client device may communicate with the application server, sending the application server user-entered text, location data for the client device, and/or client device identification data. In some embodiments, the client device may send additional data about the state of the client device to the application server. For each communication with the application server, the application server queries part or all of what the user has composed thus-far against one or more databases that are maintained by the application server or by third parties, and the application server responds to the client device with search results.

At 430, one or more search terms or words related to the textual content may be high-lighted and the opt-in user interface may be started. In some example embodiments, the client device provides the user with a visual indication of search results, which are each candidates to be included in the user-entered message. Public databases such as public data storage 210 and ingested database storage 230 for public use may be searched by the application server. Search results are indicated with an underline or other visual identifier in the composed message. Other methods of indicating positive search results include highlighting in the message, an on-screen indicator that one or more results have been found, an on-screen counter of the number of results found, an audible annunciation (e.g., a spoken announcement or an alert). While the client device-application server communication takes place, and while indicators may be shown or provided to the user in an asynchronous fashion, the user can continue to compose the textual content uninterrupted. When the user has completed composing, or at any time during composition, if search results have been returned to the client device by the application server, the user can open or navigate to the opt-in interface to select which search result links to include with the textual content.

At 440, one or more search words or phrases may be selected. In some example embodiments of the opt-in interface, the user may be presented with the results as found by the application server. The user can opt-in (or select) each result that is to be included with the textual content. Selection may be made, for example, by checking a box associated with each search result. In some example embodiments, the selection may be performed via voice where the user is asked via voice which search results to select. In the example at 440, the user has chosen to opt-in the search result for the "Acme Cafe," but not a search result for the flight information for "ABC Airlines flight 222." After selection of the search results the related links are attached to the message or document and the user can tap the "send" button to transmit the message, or the user can continue composing the message. If the user chooses to continue to edit the message, additional search results might be found based on modifications to the composed textual content.

At 450, when multiple search results are received for a search word or phrase, each of the multiple may be selected or not selected. If the search results include multiple matches for the same user-entered data (for example, if there are multiple locations of a restaurant in the area per the user-provided geo-location data), the user may select from the multiple choices provided to them within the opt-in interface. In the example at 450, "Acme Café" generated three results as provided by the application server, and the user selected the second result, the "Acme Café" location at "123 Main Street". The search results may be depicted by the client device in a particular order to the user. For example, using the user's geo-location, the client device may order the search results from closest to farthest away from the current location of the user. Using the left and right arrow buttons on the interface, the user may scroll through the different locations until the desired location is found. Since there was only one result provided for "ABC Airlines Flight 222" which in this example, the user did not opt in, there was not a multiple-choice interface presented to the user.

At 460, the client device includes the links that the user has opted-in for inclusion in the message. Depending on the application used for the user-entered data, and the functionality of the client device, the link may be included visually within or after the user-entered data as shown at 460, or the link may be embedded within the content associated with the result (e.g., The words "Acme Cafe" can be a clickable/tap-able link wherein the link is embedded and invisible to the user and the recipients/readers of the user's textual content). In some example embodiments, the client device may allow the user to preview the message including any inserted links before it is sent to the recipient. The "sent" message at 460 is also an example of the message received by the recipient.

At 470, by selecting one of the links the recipient is redirected to a webpage or other supplemental content identified by the selected link. Links created by the application server may point to content hosted by the application server, or hosted by a 3rd party, that contain information related to the data entered by at client device. In the foregoing example, the selected link points to information on a webpage regarding the "Acme Café." The information related to the "Acme Café" may be stored in public database storage 210 or ingested database storage 230.

Figure 5:
FIG. 5 depicts examples of user interface screens on a client device for a private messaging system, in accordance with some example embodiments.

FIG. 5 depicts examples of user interface screens on a client device for a private messaging system, in accordance with some example embodiments. FIG. 5 is similar to FIG. 4 except that in FIG. 5 private data for use by ABC company and public data are searched generating public and private search results, and FIG. 5 depicts an example where multiple search results are not found. ABC company is the application server customer where ABC company has elected to include ABC company's private data in the private databases for search results. As an example, ABC's private data may include the name of one of ABC's customers, "XYZ." At 510, textual content is generated. At 520, while the textual content is being generated, the client device sends textual content to the application server which performs one or more searches. At 530, one or more search terms or words related to the textual content may be high-lighted and the opt-in user interface may be started. At 540, one or more search words or phrases may be selected. At 550, the client device includes the selected opted-in links in the message sent to a reader. At 560, by selecting one of the links, the reader is taken to the corresponding web page.

At 510, a user generates or selects textual content as part of a message or document. For example, the user may compose a text message to a recipient in a messaging application. The client device may be a stand-alone messaging application, or may be a plug-in or other program that interfaces with a messaging application. In some example embodiments, the textual information may be text from a speech-to-text application. For example, a user may speak a message and a speech-to-text application transforms the speech into text that is input into a messaging application which in turn interfaces to the application server.

At 520, while the textual content is being generated, the client device may send textual content including words or phrases to the application server which performs one or more searches. While the user is composing the message, the client device may communicate with the application server, sending the application server user-entered text, location data for the client device, and/or client device identification data. In some embodiments, the client device may send additional data about the state of the client device to the application server. For each communication with the application server, the application server queries part or all of what the user has composed thus-far against one or more databases that are maintained by the application server or by third parties, and the application server responds to the client device with search results. In the example at 520, "Acme Café" has been entered.

At 530, one or more search terms or words related to the textual content may be high-lighted and the opt-in user interface may be started. Public databases such as public database storage 210 and ingested database storage 230 for public use may be searched by the application server. In the example of FIG. 5, private databases such as private database storage 220 and ingested database storage 230 for private use by ABC company may be searched by the application server. In some example embodiments, the client device generates a visual indication of search results, which are each candidates to be included with the textual content. Search results may be indicated with an underline or other visual identifier in the composed message. Other methods of indicating positive search results include highlighting in the message, an on-screen indicator that one or more results have been found, an on-screen counter of the number of results found, an audible annunciation. While the client device-application server communication takes place, and while indicators may be shown or provided to the user in an asynchronous fashion, the user can continue to compose their message uninterrupted. When the user has completed composing, or at any time during composition, if search results have been returned to the client device by the application server, the user can open or navigate to an opt-in interface to select which search result links to include with the textual content. In the example at 530, "XYZ," the name of a customer has been added to the message.

At 540, one or more search words or phrases may be selected. In some example embodiments of the opt-in interface, the user may be presented with the results as found by the application server. The user can opt-in (or select) each result that is to be included with the textual content. For example, a selection may be made by checking a box associated with a search result. In the example at 540, the user has chosen to opt-in the search result for "XYZ," the name of a customer and has not selected "Acme Café," After selection of the search results the related links are attached to the message or document and the user can tap the "send" button to transmit the message, or the user can continue composing the message. If the user chooses to continue to edit the message, additional search results may be found based on modifications to the composed textual content. In the example of FIG. 5, the search for "XYZ" is performed using the private database for ABC company. If "Acme Café" had been selected, the corresponding search results would be from a public database because "Acme Cafe" is not included in the ABC company private database.

At 550, the client device includes the opted-in links in the message sent to a reader. Depending on the application used for the user-entered data, and the functionality of the client device, the link may be included visually within or after the user-entered data as shown at 550, or the link may be embedded within the content associated with the result (e.g., The words "Customer XYZ" can be a clickable/tap-able link wherein the link is embedded and invisible to the user and the recipients/readers of the user's content). In some example embodiments, the client device may allow the user to preview the message including any inserted links before it is sent to the recipient. The "sent" message at 550 is also an example of the message received by the recipient.

At 560, by selecting one of the links in the message, the recipient or user that sent the message is redirected to a webpage or other supplemental content identified by the selected link. Links created by the application server may point to content hosted by the application server, or hosted by a third party, that contain information related to the data entered at client device. In the foregoing example, the selected link points to information on a webpage regarding "XYZ." The "XYZ" information including the link may be stored in private database storage 220 or ingested database storage 230.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. Computer readable media suitable for storing computer program instructions and data include all forms of non-volatile memory, media and non-transitory memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The disclosed embodiments, the functional operations, and modules described in this document can be implemented in digital electronic circuitry, or in computer software, firmware, or hardware, including the structures disclosed in this document and their structural equivalents, or in combinations of one or more of them. The disclosed embodiments can be implemented as one or more computer program products, i.e., one or more modules of computer program instructions encoded on a non-transitory computer readable medium for execution by, or to control the operation of, a data processing apparatus. The computer readable medium can be a machine-readable storage device, a machine-readable storage substrate, a memory device, a composition of matter effecting a machine-readable propagated signal, or a combination of one or more them. The term "computer" encompasses all apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of electronic messaging, the method comprising:

receiving, at an application server from a client device, user information including textual content, location information related to the client device, client identification information, and client service information;

applying, at the application server, the received user information to one or more databases to determine one or more search results, wherein the one or more databases include contextually relevant information to the user information, and wherein the one or more databases are stored locally at the application server; and transmitting, to the client device, the one or more search results, wherein each search result includes a link pointing to information relevant to the received user information including the textual content, wherein the client device displays a highlight indication for each word or phrase from the textual content having a search result from the one or more search results and a control to display a supplemental user interface, wherein the client device displays the supplemental user interface when the control is selected by a user, the supplemental user interface displaying each word or phrase from the textual content having a corresponding search result from the one or more search results and a selection control that allows the user to select one or more search results associated with the displayed each word or phrase, and wherein the textual content is sent to a reader and, for each of the one or more search results selected by the user, the textual content is supplemented with a corresponding link pointing to information relevant to the textual content.

2. The method of claim 1, further comprising:
storing, at the application server in a results database, the one or more search results and the user information.

3. The method of claim 1, wherein the receiving the textual information comprises receiving the textual information from a text messaging application, an instant messaging application, an email application, a document, or a website.

4. The method of claim 1, wherein the one or more databases include one or more public databases available to users of the application server, and wherein at least one of the one or more public databases is stored locally at the application server.

5. The method of claim 1, wherein the one or more databases include one or more private databases available to only a selected group of users of the application server, wherein the selected group of users is associated with a predetermined business or corporation, and wherein at least one of the one or more private databases is stored locally at the application server.

6. The method of claim 1, wherein the one or more databases stored locally at the application server enable a rapid determination of the one or more search results.

7. The method of claim 1, wherein the client device removes words contained on a common word list from the textual content before sending the contextual content to the application server, wherein the common word list includes words such as "a", "the", and "to".

8. The method of claim 1, wherein the application server intermittently or periodically receives updates to the user information as the textual content is being generated at the client device.

9. The method of claim 1, wherein the application server determines from the client identification information that the client device is registered with the application server, and determines from the client service information that the client device is authenticated to access the application server.

10. The method of claim 1, wherein the location information includes one or more of a global positioning system (GPS) location, a location based on triangulation information from a plurality of cellular telephone base stations, or location information from Internet service providers (ISP).

11. The method of claim 1, wherein the application server includes one or more of a computer system, a network server, or a virtual machine, and the client device includes one or more of a smartphone, a cell phone, a laptop computer, a tablet computer, a desktop computer, or other computing device.

12. A non-transitory computer readable medium encoded with executable instructions that when executed on at least one processor, cause operations comprising:
receiving, at an application server from a client device, user information including textual content, location information related to the client device, client identification information, and client service information, wherein the application server determines from the client identification information that the client device is registered with the application server, and determines from the client service information that the client device is authenticated to access the application server;
applying, at the application server, the received user information to one or more databases to determine one or more search results, wherein the one or more databases include contextually relevant information to the user information, and wherein the one or more databases are stored locally at the application server; and
transmitting, to the client device, the one or more search results,
wherein each search result includes a link pointing to information relevant to the received user information including the textual content,
wherein the client device displays a highlight indication for each word or phrase from the textual content having a search result from the one or more search results and a control to display a supplemental user interface,
wherein the client device displays the supplemental user interface when the control is selected by a user, the supplemental user interface displaying each word or phrase from the textual content having a corresponding search result from the one or more search results and a selection control that allows the user to select one or more search results associated with the displayed each word or phrase, and
wherein the textual content is sent to a reader and, for each of one or more search results selected by the user, the textual content is supplemented with a corresponding link pointing to information relevant to the textual content.

13. The non-transitory computer readable medium of claim 12, wherein the receiving the textual information comprises receiving the textual information from a text messaging application, an instant messaging application, an email application, a document, or a web site.

14. The non-transitory computer readable medium of claim 12, wherein the one or more databases include one or more private databases available to only a selected group of users of the application server, wherein the selected group of users is associated with a predetermined business or corporation.

15. The non-transitory computer readable medium of claim 12, wherein the one or more databases that are stored locally at the application server enable a rapid determination of the one or more search results.

16. The non-transitory computer readable medium of claim 12, wherein the application server intermittently or periodically receives updates to the user information as the textual content is being generated at the client device.

17. An apparatus for electronic messaging comprising:
at least one processor; and
at least one memory including computer program code, the at least one processor, the at least one memory, and the computer program code configured to cause the apparatus to at least:
receive, at the apparatus from a client device, user information including textual content, location information related to the client device, client identification information, and client service information, wherein the apparatus determines from the client identification information that the client device is registered with the apparatus, and determines from the client service information that the client device is authenticated to access the apparatus;
apply, at the apparatus, the received user information to one or more databases to determine one or more search results, wherein the one or more databases include contextually relevant information to the user information, and wherein the one or more databases are stored locally at the application server; and
transmit, to the client device, the one or more search results, wherein each search result includes a link pointing to information relevant to the received user information including the textual content, wherein the client device displays a highlight indication for each word or phrase from the textual content having a search result from the one or more search results and a control to display a supplemental user interface, wherein the client device displays the supplemental user interface when the control is selected by a user, the supplemental user interface displaying each word or phrase from the textual content having a corresponding search result from the one or more search results and a selection control that allows the user to select one or more search results associated with the displayed each word or phrase, and wherein the textual content is sent to a reader and, for each of the one or more search results selected by the user, the textual content is supplemented with a corresponding link pointing to information relevant to the textual content.

18. The apparatus of claim 17, wherein the receiving the textual information comprises receiving the textual information from a text messaging application, an instant messaging application, an email application, a document, or a website.

19. The apparatus of claim 17, wherein the one or more databases that are stored locally at the apparatus enable a rapid determination of the one or more search results.

20. The apparatus of claim 17, wherein the apparatus intermittently or periodically receives updates to the user information as the textual content is being generated at the client device.

21. The method of claim 1, further comprising:
receiving a selection of one of the one or more selectable indications from a user, wherein the selection corresponds to one of the one or more associated search results.

22. The method of claim 1, wherein at least one of the one or more selectable indications is not selected corresponding to one of the one or more associated search results not being sent to the reader.

23. The method of claim 1, wherein the at least one link included in each search result is appended at an end of a text message or an email, and wherein the one or more links are hyperlinks.

24. The method of claim 1, wherein the reader comprises a user application at a recipient wireless device.

25. The method of claim 1, wherein selecting one or more of the one or more selectable indications opts in to providing the corresponding one or more associated search results to the reader.

26. The method of claim 1, wherein at least one of the one or more databases is stored remote from the application server.

27. The method of claim 1, wherein the application server is distributed across a plurality of physical or virtual servers at different locations.

28. The method of claim 1, wherein the one or more databases stored locally at the application server comprise:
a business directory;
a directory of individuals;
a factual database;
an encyclopedia; or
a dictionary.

* * * * *

UNITED STATES PATENT AND TRADEMARK OFFICE
CERTIFICATE OF CORRECTION

| | |
|---|---|
| PATENT NO. | : 11,562,035 B2 |
| APPLICATION NO. | : 15/924130 |
| DATED | : January 24, 2023 |
| INVENTOR(S) | : Scott Lipsky |

It is certified that error appears in the above-identified patent and that said Letters Patent is hereby corrected as shown below:

In the Specification

In Column 4, Line 53, delete "1-to1" and insert -- 1-to-1 --.

In Column 10, Line 12, delete "servers" and insert -- server's --.

In the Claims

In Column 20, Line 16, in Claim 25, delete "one or more" and insert -- one --.

Signed and Sealed this
Thirteenth Day of June, 2023

Katherine Kelly Vidal
*Director of the United States Patent and Trademark Office*